April 16, 1957 B. BARENYI 2,788,983
CHASSIS FRAME FOR VEHICLES
Filed Feb. 17, 1950

INVENTOR
BÉLA BARÉNYI
BY
Duche and Padlon
ATTORNEYS

United States Patent Office 2,788,983
Patented Apr. 16, 1957

2,788,983

CHASSIS FRAME FOR VEHICLES

Béla Barényi, Stuttgart-Rohr, Germany

Application February 17, 1950, Serial No. 144,799

Claims priority, application Germany February 19, 1949

9 Claims. (Cl. 280—106)

This invention relates to a chassis for motor vehicles having an annular or ring-shaped frame consisting of longitudinal and transverse girder members, said transverse girder members being disposed between the vehicle axles and being inclined towards the vehicle ends, for example in an arrowhead-like shape.

A main object of the invention is to improve the manufacture as well as to facilitate the connection and the changing and repairing of damaged frame parts. A further object of the invention is a frame which is to be interchangeably available for different vehicle types.

Consequently an essential feature of the invention consists in that the annular frame is divided within the area of the transverse girders, for example, at the joints where the transverse and longitudinal girder members meet each other, or in the case of transverse girders bent arrowhead-like, in place where said girders are bent, and that the parts are detachably connected together or connected to eventually provided chassis or frame parts, which will continue or traverse said annular frame.

Such divided frames, the parts of which are easily connectable and disconnectable, among other advantages, permit of manufacturing different types of frames and thereby of adapting the frame type to the eventual requirements, by suitably combining the diverse frame parts or by inserting additional frame parts.

Further features, objects and advantages in accordance with the present invention will become more obvious from the following description when taken in connection with the accompanying drawing which shows, for purposes of illustration only, several embodiments and wherein Figure 1 is a longitudinal sectional view of a frame construction in accordance with the present invention;

Figure 3:
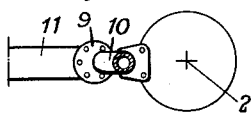
Figure 3 is a cross-sectional view taken along lines 3—3 of Figure 4 of still another embodiment in accordance with the present invention.
Figure 4:
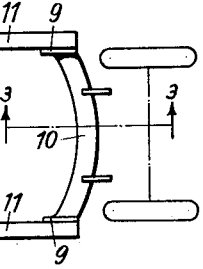
Figure 5:
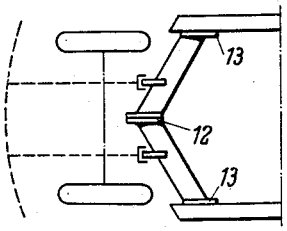
Figure 6:
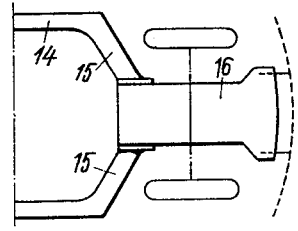
Figure 8:
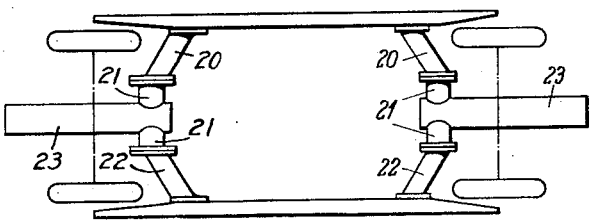
Figure 9:
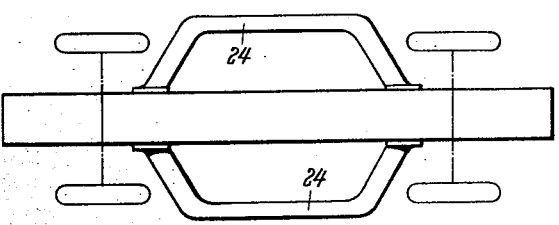
Figure 7:
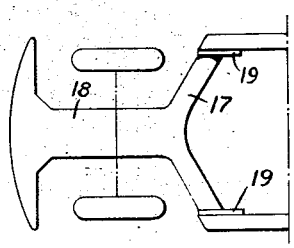

Figure 4 is a plan view of a frame construction of the embodiment shown in Figure 3, and Figures 5 through 9 are plan views of still further modifications of a frame construction in accordance with the present invention of which Figures 5, 6, and 7 show a half of a vehicle while Figures 8 and 9 show the frame construction of the entire vehicle.

Figure 1:
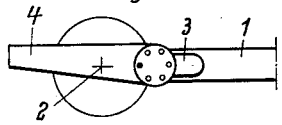

The chassis according to Fig. 1 comprises a frame, the longitudinal girders 1 of which are connected between the axles 2, by a transverse girder 3 to form an annular frame, while the longitudinal girder part 4 projecting beyond one axle 2 may form the prolongation of the lateral longitudinal girder 1 or a frame part constructed as a central girder according to Figures 6 through 9.

Figure 2:
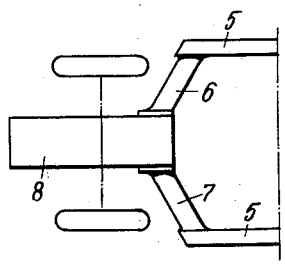
Figure 2 is a plan view of a modification of a frame construction in accordance with the present invention, similar to Figure 1, illustrating a half of a vehicle having one vehicle axle each.

Between the longitudinal girders 5 of Fig. 2 there is shown a transverse girder, subdivided into the parts 6 and 7, each welded to the adjacent longitudinal girder 5, while their inner ends are detachably connected to the frame projection 8 constructed as a central girder, screwed together by means of flanges.

In Figures 3 and 4a separation of the annular frame is provided only at the joints 9 between the nondivided transverse girder 10 and the longitudinal girders 11.

Fig. 5 shows the separable connection of the annular frame in the centre of the arrowhead-like bent transverse girder at 12 and a further separable connection at 13.

In the annular frame according to Figure 6 the longitudinal girders 14 are manufactured as a unit or integrally with parts 15 of the transverse girder, the parts 15 being detachably connected to the frame projection 16. Of course they might also be directly connected together without the interposition of the projection 16.

In Figure 7 however the transverse girder 17 is manufactured as a unit or integral with the frame projection 18 and is detachably connected to the longitudinal girders at 19.

In Figure 8 the transverse girder is subdivided into three parts 20, 21, 22, the central part 21 being welded to a frame projection 23 and being detachably connected to the other parts.

Fig. 9 which illustrates a similar construction as in Fig. 6, indicates an annular frame 24, which is longitudinally traversed by a central girder.

The term "divided within the area of the transverse girder members" or the term "divided in the transverse beams" is used in the specification and in the claims herein to designate the joints formed between the lateral ends of the transverse girder members and the longitudinal girder members, the joints formed between the transverse girder members and the additional central longitudinal girder members, and the joints in the transverse girder members themselves such as shown at 12 in Figure 5 or between members 20, 21 and 22 of Figure 8.

The Figures 1, 2, 3, 4, 5, 6, and 7 illustrate only a portion or symmetrical half of an angular vehicle frame in accordance with the present invention. The angular frame may be completed by providing another half symmetrically formed to that illustrated as was done, for example, in connection with Figure 8 in which two symmetrical halves were combined to show a vehicle frame construction. However, different types of frames may be manufactured to adapt the type of frame to the eventual requirements by suitably combining the various frame parts or by inserting additional frame parts.

The invention is not limited to the illustrated embodiments, but may be varied within the scope of the claims.

What I claim is:

1. Chassis for motor vehicles having two axles comprising longitudinal beams spaced apart a distance in excess of the wheel tread of the vehicle and two spaced transverse beams, the transverse beams being arranged between the axles of the vehicle and inclined toward the corresponding end of the vehicle and, together with the longitudinal beams forming a ring-shaped frame, the frame being divided in at least two places within the area of each of said transverse beams and the frame portions being connected with each other by disengageable means.

2. Chassis for motor vehicles having two axles comprising longitudinal beams spaced apart a distance at least equal to the wheel tread of the vehicle and two transverse beams, the transverse beams being arranged between the axles of the vehicle and inclined toward the corresponding end of the vehicle and, together with the longitudinal beams forming a relatively flattened ring-shaped frame, each of said transverse beams being divided in at least two places including the apex of their inclination, and the frame sections resulting from this division being connected with each other by disengageable means.

3. Chassis for motor vehicles having a plurality of axles comprising longitudinal beams spaced apart a distance greater than the wheel tread of the vehicle and two transverse beams, the transverse beams being arranged at the respective ends of the longitudinal beams and between the axles of the vehicle and inclined toward the corresponding end of the vehicle and, together with the longitudinal beams forming an annular frame; the frame being divided at least at two joints of each of said transverse beams with said longitudinal beams and the frame sections resulting from this division being connected with each other by disengageable means.

4. Chassis for motor vehicles having two axles comprising longitudinal beams spaced apart a distance greater than the wheel tread of the vehicle and two spaced transverse beams, the transverse beams being arranged between the axles of the vehicle and inclined towards the longitudinal center of the corresponding end of the vehicle and, together with the longitudinal beams forming a substantially ring-shaped frame and being provided with joints, the frame being divided in the area of the transverse beams, an additional continuous longitudinal beam in the longitudinal center of the chassis, the division of the frame being effected at the joints between the central longitudinal beam and the transverse beams, and detachable means for connecting said frame extensions to said additional beam.

5. Chassis for motor vehicles having two axles comprising longitudinal beams and transverse beams, said transverse beams being located between said axles and being inclined toward corresponding ends of the vehicle, additional longitudinal beam members extending in the central longitudinal plane of said vehicle from said transverse beams toward respective ends of said vehicle, said longitudinal and transverse beams and said additional longitudinal beam members being formed of separate parts and including respective joint means, and means for detachably connecting said longitudinal beams with said transverse beams and said transverse beams with said additional longitudinal beam members at said respective joint means.

6. Chassis for motor vehicles having two axles comprising longitudinal beams and two transverse beams, said transverse beams being located between said axles and being inclined toward respective vehicle ends, said transverse beams forming with said longitudinal beams a substantially ring-shaped frame, additional longitudinal beam members extending in the central longitudinal plane of said vehicle from said transverse beams toward the respective vehicle ends and forming with said transverse beams a unitary structure, said longitudinal and transverse beams being formed of separate parts having respective joint means, and means for detachably connecting said longitudinal and transverse beams at said respective joint means.

7. Chassis for motor vehicles having at least two axles comprising longitudinal beams and two transverse beams together forming a frame, said transverse beams being located between said axles and being inclined toward the corresponding vehicle end, additional longitudinal beam means extending from each transverse beam in the central longitudinal plane of the vehicle, the frame being divided on both sides of said beam means in said transverse beams, and detachable means for connecting said transverse beams with said beam means.

8. Chassis for motor vehicles according to claim 7 wherein said beam means extended from said transverse beams toward the nearest vehicle end.

9. Chassis for motor vehicles according to claim 7 wherein said beam means form a continuous additional longitudinal beam passing through the central longitudinal plane of the vehicle.

References Cited in the file of this patent

UNITED STATES PATENTS

| 1,478,373 | Belden | Dec. 25, 1923 |
| 1,659,018 | Clark | Feb. 14, 1928 |
| 1,953,515 | Smith | Apr. 3, 1934 |
| 2,039,233 | MacFarlane | Apr. 28, 1936 |
| 2,189,719 | Wallace | Feb. 6, 1940 |
| 2,218,881 | Herlach | Oct. 22, 1940 |
| 2,301,330 | Schafer | Nov. 10, 1942 |
| 2,485,500 | Lyman | Oct. 18, 1949 |

FOREIGN PATENTS

| 798,153 | France | May 11, 1936 |
| 376,384 | Great Britain | July 14, 1932 |